(12) United States Patent
Hirano et al.

(10) Patent No.: US 6,509,930 B1
(45) Date of Patent: Jan. 21, 2003

(54) CIRCUIT FOR SCAN CONVERSION OF PICTURE SIGNAL USING MOTION COMPENSATION

(75) Inventors: Yasuhiro Hirano, Hachioji (JP); Takaaki Matono, Yokohama (JP); Haruki Takata, Yokohama (JP); Takashi Hasegawa, Yokohama (JP); Kazuo Ishikura, Yokohama (JP); Masato Sugiyama, Yokohama (JP); Mitsuo Nakajima, Yokohama (JP); Yasutaka Tsuru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 09/596,555

(22) Filed: Jun. 19, 2000

(30) Foreign Application Priority Data

Aug. 6, 1999 (JP) ............................................ 11-223436

(51) Int. Cl.[7] ................................................ H04N 7/01
(52) U.S. Cl. ........................ 348/452; 348/448; 348/700
(58) Field of Search ................................ 348/448, 451, 348/450, 452, 700, 699; H04N 7/01

(56) References Cited

U.S. PATENT DOCUMENTS 5,565,922 A * 10/1996 Krause ........................ 348/699
5,784,115 A * 7/1998 Bozdagi ..................... 348/448

* cited by examiner

*Primary Examiner*—Sherrie Hsia
(74) *Attorney, Agent, or Firm*—Mattingly, Stanger & Malur, P.C.

(57) ABSTRACT

A low-cost motion-compensated picture signal scan conversion circuit ensuring high picture quality is to be provided. The circuit has a motion-adaptive first interpolation signal generator; a second motion-compensated interpolation signal generator; a motion vector detector; and a setting unit for checking the reliability of motion compensation by comparing signals from the second interpolation signal generator with signals on interlaced scanning lines, and setting the selection of signals from the first and second interpolation signal generators, wherein interlaced scanned signals are converted into progressive scanned signals by setting the threshold so that the threshold become smaller with an increase in the number of re-searched blocks in the detection of motion vectors.

16 Claims, 15 Drawing Sheets

FIG. 7
| UPPER LEFT B1 | ABOVE B2 | UPPER RIGHT B3 |
|---|---|---|
| LEFT B4 | CURRENT BLOCK | RIGHT B5 |
| LOWER LEFT B6 | BELOW B7 | LOWER RIGHT B8 |
FIG. 8A
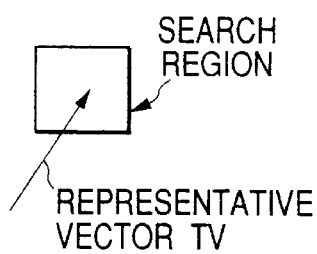
FIG. 8B
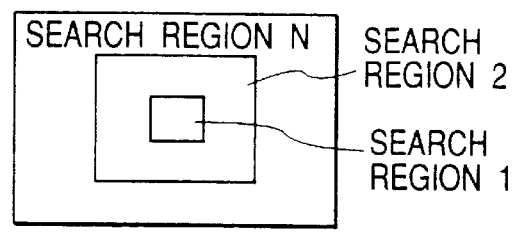
FIG. 9
| UPPER LEFT B1 | UP B2 | UPPER RIGHT B3 |
|---|---|---|
| LEFT B4 | MB1 ... MB2 | RIGHT B5 / MINI BLOCKS |
| LOWER LEFT B6 | DOWN B7 | LOWER RIGHT B8 |

| VTP | VSP | TL | S40 | VEG | SL |
|---|---|---|---|---|---|
| V pan | — | — | — | — | 1 |
| NORMAL | |MV|<V1 | CHARACTERISTIC 1 | 1 | — | 1 |
| | V1<|MV|<V2 | CHARACTERISTIC 2 | 1 | 1 | 1 |
| | V2<|MV| | CHARACTERISTIC 3 | 1 | 1 | 1 |

| VTP | VSP | TL | S40 | VEG | SL |
|---|---|---|---|---|---|
| V pan | — | — | — | — | 1 |
| NORMAL | |MV|<V1 | CHARACTERISTIC 1 | 1 | — | 1 |
| | V1<|MV|<V2 | CHARACTERISTIC 2 | 1 | 1 | 1 |
| | V2<|MV|<V3 | CHARACTERISTIC 2 | 1 | 1 | 1 |
| | V3<|MV| | — | — | — | 0 |

CIRCUIT FOR SCAN CONVERSION OF PICTURE SIGNAL USING MOTION COMPENSATION

BACKGROUND OF THE INVENTION

The present invention relates to a circuit for scan conversion which converts interlaced scanned picture signals into progressive scanned picture signals by deinterlacing, and more particularly to a circuit for scan conversion of picture signals using motion compensation, which is hardly susceptible to flicker artifact or deterioration in resolution and suitable for realization of low-cost scan conversion ensuring high picture quality.

Recently, increasing numbers of personal computers and television sets display their pictures by progressive scanning with a view to ensuring high picture quality.

However, most of the available video software products consist of signals deriving from interlaced scanning of objects. Accordingly, they require processing to convert interlaced scanned signals into progressive scanned signals.

Many ideas using motion-adaptive interpolation have been proposed for this signal processing. Motion-adaptive interpolation means generation of signals on scanning lines skipped by interlaced scanning to convert them into progressive scanned signals by adaptively varying, according to the motions of pictures, the mixing ratio of signals suitable for still pictures generated by field insertion and signals suitable for moving pictures generated by intra-field interpolation.

However, the poor vertical resolution of interpolation signals for moving pictures invites a problem that certain motions are inevitably subject to blurring or flicker artifact.

To solve this problem, research and development attempts are now under way to achieve conversion into progressive scanning by motion compensation. Such attempts are intended to generate interpolation signals suitable for moving pictures from signals resulting from the shifting of signals in the previous field to the position of the current field according to motion vectors and from signals of the current field, and thereby to realize conversion into high quality progressive scanning which can hardly be attained by the conventional motion-adaptive interpolation.

This motion-compensated scan conversion, however, requires detection of the motion vectors of pictures for the motion compensation process. Also, if motion vectors are erroneously detected, very obstructive interference will arise, inviting extreme deterioration of picture quality.

Therefore, application of a motion-compensated scan conversion circuit to a television receiver or a data processing terminal for home use would involve many unsolved problems including efficient detection of motion vectors and control of picture quality deterioration ensuing from erroneous detection.

SUMMARY OF THE INVENTION

The present invention, attempted in view of the above-noted problems, is intended to provide a motion-compensated scan conversion circuit ensuring high picture quality at low cost.

To achieve this object, the invention realizes a low-cost scan conversion circuit for high quality picture signals by the technical means described below.

Regarding the detection of motion vectors, first the already detected vectors around the current block are used as reference vectors, and that with the least estimated motion error is set to be the representative vector of the current block. Next, blocks whose estimated motion errors exceed the threshold are subjected to re-search by tree search or block matching to detect motion vectors. Then, miniblocks resulting from the horizontal and vertical division of blocks are subjected to miniblock division search using the motion vectors of surrounding blocks. Further, the motion vector of each pixel is detected by smoothing the motion vectors of these miniblocks. This means for signal processing by motion vector detection can dramatically reduce the quantity of computation needed for motion vector detection to a very small fraction of the current volume, a quotient of division by tens or even hundreds.

Regarding the control of picture quality deterioration ensuing from erroneous detection of motion vectors, the reliability of motion compensation is checked by taking note of the signal continuity between the current pixels on interpolated scanning lines generated by motion compensation and pixels on interlaced scanning lines above and underneath them, and comparing the former pixels with the latter. In a region where reliability is determined to be insufficient, the generation of interpolation signals by motion compensation is stopped. It has been found that where re-searching is frequently done in the aforementioned procedure of motion vector detection, the accuracy of motion vectors is also poor. In view of this finding, signal processing is carried out to vary the threshold of pixel comparison according to the frequency of this re-searching. Further signal processing is performed to restrict the generation of interpolation signals by motion compensation to the region of high vertical frequency components of pictures or to a prescribed speed range of motion vectors. These means for signal processing can very efficiently eliminate picture quality deterioration intrinsic to motion compensation attributable to erroneous detection of motion vectors.

BRIEF DESCRIPTION OF THE DRAWINGS

These and other objects, features and advantages of the present invention will become more apparent from the following detailed description of the preferred embodiments when taken in conjunction with the accompanying drawings, wherein:

FIG. 7 shows typical reference blocks around a current block;

FIGS. 8A and 8B schematically illustrate tree search and block matching actions;

FIG. 9 schematically illustrates miniblock division search;

DESCRIPTION OF THE PREFERRED EMBODIMENTS (Embodiment 1)

A first preferred embodiment of the present invention will be described below with reference to FIG. 1 through FIG. 14. Incidentally, this embodiment is suitable for motion vector detection in output picture signal sequences of progressive scanning.

Figure 1:
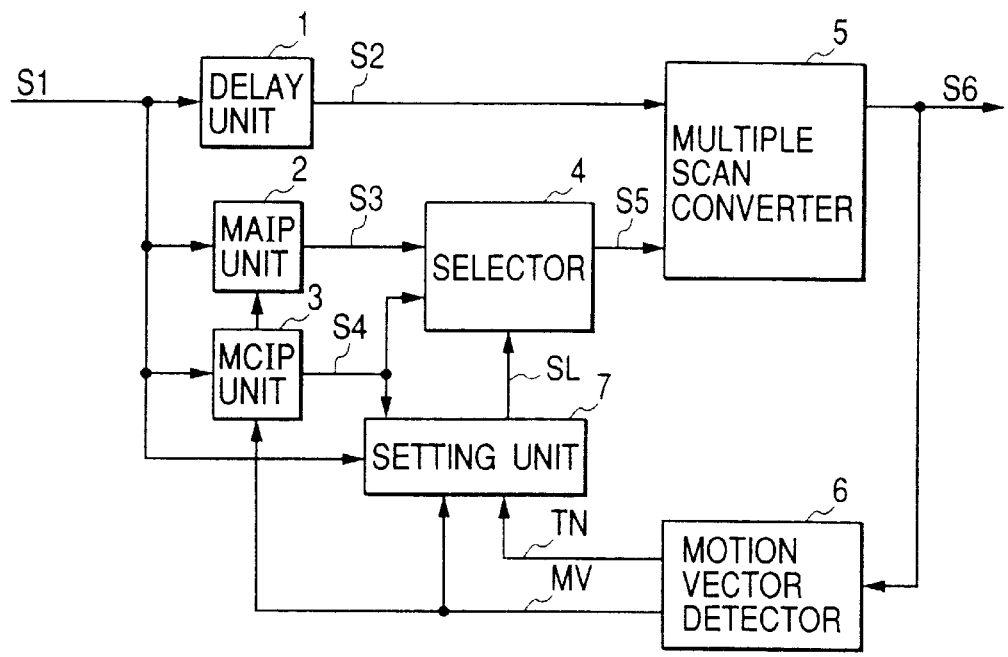
FIG. 1 is a block diagram of a scan conversion circuit using motion compensation, which is a first preferred embodiment of the invention.

FIG. 1 is a block diagram of this embodiment, which is a scan conversion circuit using motion compensation, comprising a delay unit 1, an MAIP unit 2, an MCIP unit 3, a selector 4, a multiple scan converter 5, a motion vector detector 6, and a setting unit 7.

Input picture signals S1 (luminance signals and color differential signals) of interlaced scanning are entered into the delay unit 1, MAIP unit 2, MCIP unit 3, and setting unit 7.

The MAIP unit 2 generates interpolation signals S3 by motion-adaptive interpolation using motion vectors MV. The MCIP unit 3 generates interpolation signals S4 by motion-compensated interpolation using motion vectors MV. The selector 4 selects either a signal S3 or a signal S4 with a control signal SL, and supplies it as an interpolation signal S5.

The delay unit 1 adjusts any delay in time ensuing from signal processing. Its output signals S2 and the interpolation signals S5 undergo ½ compression of the temporal axis and rearrangement of the time series by the multiple scan converter 5, which supplies progressive scanned picture signals S6 (luminance signals and color differential signals).

The motion vector detector 6 detects from the luminance signals of these progressive scanned picture signals S6 motion vectors for use in motion compensation, and supplies the motion vector MV for each pixel and the number TN of re-search blocks.

The setting unit 7, using the input picture signals S1, the luminance signals of the interpolation signals S4 from the MCIP unit 3, the motion vector MV for each pixel and the number TN of re-search blocks, checks the reliability of motion compensation, and generates the control signal SL so as to select interpolation signals of motion compensation algorithms for high-reliability pixels and interpolation signals of motion-adaptive algorithms for low-reliability pixels.

The configuration and operation of each unit of the block will now be described in detail.

Figure 2:
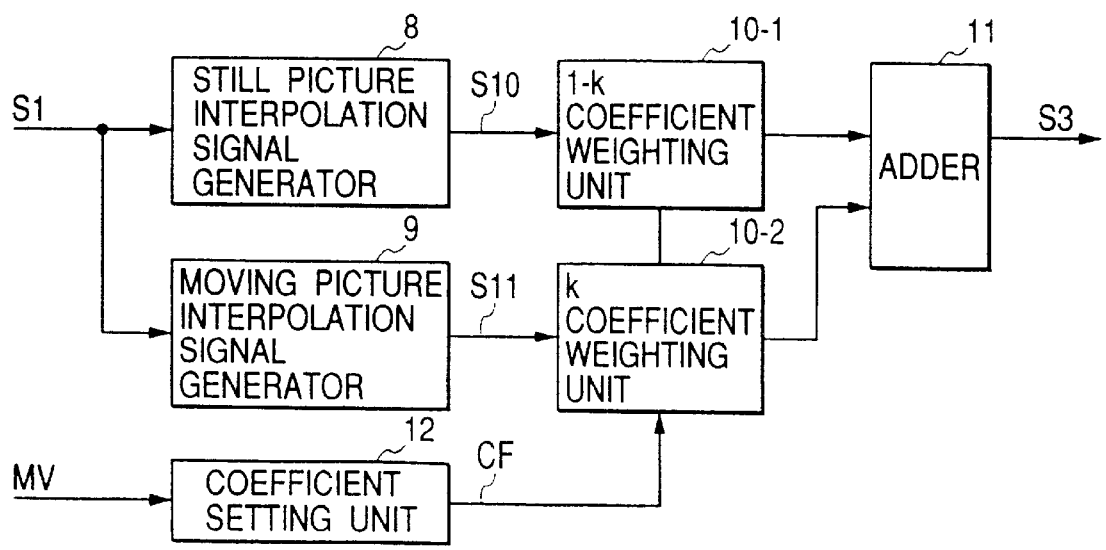
FIG. 2 is a block diagram of a typical configuration of the MAIP unit of the first embodiment.
Figure 3:
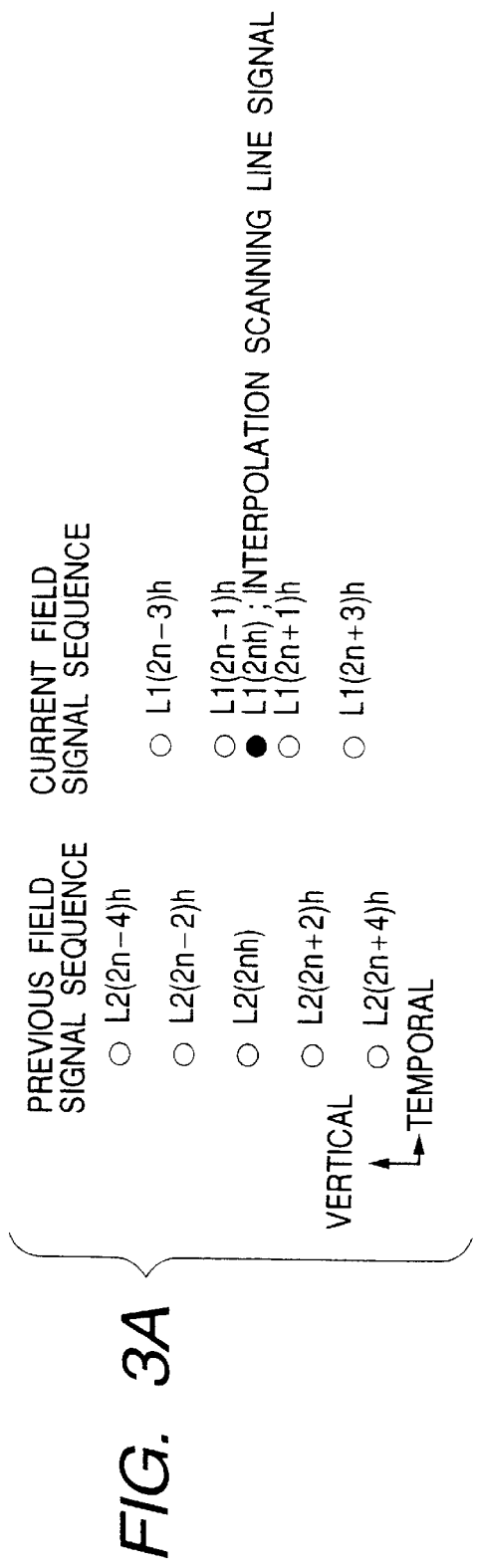
FIGS. 3A and 3B are block diagrams of a typical configuration of the MCIP unit of the first embodiment.

FIG. 2 illustrates a typical configuration of the MAIP unit 2. A still picture interpolation signal generator 8 generates interpolation signals S10 suitable for still pictures in inter-field signal processing. A moving picture interpolation signal generator 9 generates interpolation signals S11 suitable for intra-field signal processing or vertical-temporal interpolation filtering. A coefficient setting unit 12 sets a mixing ratio CF (from still k=0 to moving k=1) according to the speed of the motion vector MV. The coefficient weighting unit 10-1 and 10-2 performs weighting with coefficients 1-k and k. Then, an adder 11 adds the two signals, and supplies interpolation signals S3.

Now will be described the MCIP unit 3 with reference to FIGS. 3A and 3B. This is particularly suitable for motion compensation in accordance with the GST (General Sampling Theorem).

The GST is a generalization of the sampling theorem. It is applied, as illustrated in FIG. 3A, to interlaced scanned signal sequences, which can be deemed to be sampling in a vertical/temporal region, to generate interpolation signals.

With the signal sequence of scanning lines of the current field being represented by . . . , L1(2n−3)h, L1(2n−1)h, L1(2n+1)h, L1(2n+3)h, . . . ; that of the previous field by . . . , L2(2n−4)h, L2(2n−2)h, L2(2n)h, L2(2n+2)h, L2(2n+4)h, . . . ; and motion vectors in a field period by y (where y=2h(q+r); 2h representing the scanning line spacing; q being an integer, and r, a decimal), signals on the interpolation scanning line L1(2nh) are generated by calculation represented by equation 1.

Equation 1

$$L1(2nh) = \Sigma h1(j) \cdot L1(2(n+j)h - h) + \Sigma h2(j) \cdot L2(2(n-q+j)h) \quad (1)$$

To add, coefficients h1(j) and h2(j) are denoted by the following equation 2 and equation 3. Here, function sinc{x} represents sin(x)/x.

Equation 2

$$h1(j) = (-1)^{**}j \cdot \text{sinc}\{\pi(j-0.5)\} \cdot \sin(\pi r)/\cos(\pi r) \quad (2)$$

Equation 3

$$h2(j) = (-1)^{**}j \cdot \text{sinc}\{\pi(j+r)\}/\cos(\pi r) \quad (3)$$

FIG. 3B illustrates a typical configuration of this, comprising a tapped delay unit 13, an MC coefficient weighting unit 14, an adder 15 and an MC coefficient generating unit 16. The MC coefficient weighting unit 14 weights the signal sequences of the current field and the previous field obtained at the taps of the tapped delay unit 13 with coefficient values h1(j) and h2(j) represented by equation 2 and equation 3, respectively. The adder 15 adds these, and supplies interpolation signals S4 generated by the calculation represented by equation 1. The MC coefficient generating unit 16 calculates for each pixel parameters q and r of the motion vector y in the field period from the motion vector MV, and generates their coefficient values h1(j) and h2(j). This processing can be realized by, for example, a table look-up using a ROM.

Figure 4:
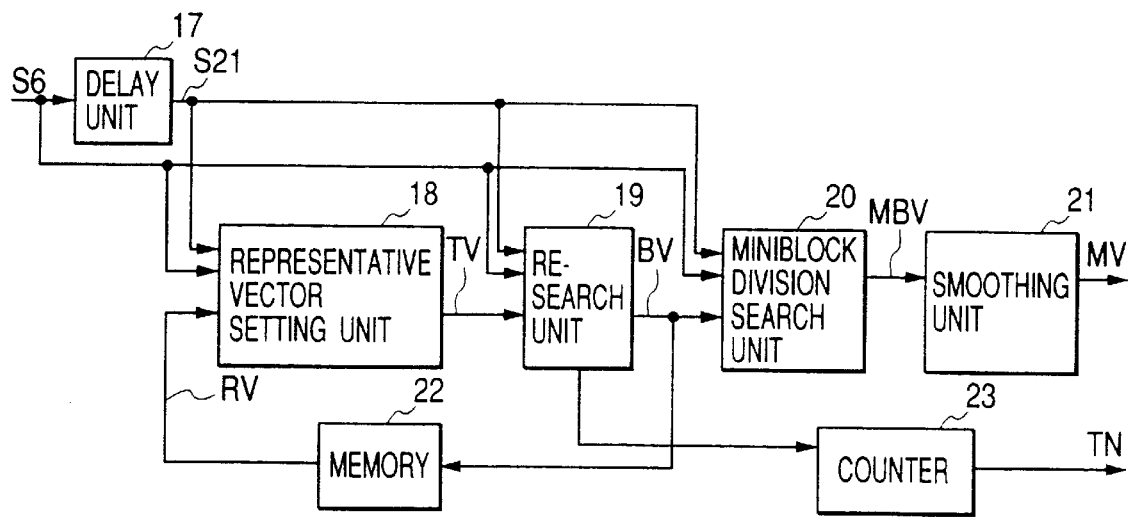
FIG. 4 is a block diagram of a typical configuration of the motion vector detector of the first embodiment.

Next, the motion vector detector 6 will be described with reference to FIG. 4 through FIG. 9. FIG. 4 illustrates a typical configuration of the detector, comprising a delay unit 17, a representative vector setting unit 18, a research unit 19, a miniblock division search unit 20, a smoothing unit 21, a memory 22 and a counter 23.

The frame delay unit 17 generates signals S21 by delaying the luminance signals of output progressive scanned picture signals S6 by a prescribed frame period. The extent of this delay is dependent on the accuracy of motion compensation. For instance, if the required accuracy of vertical motions is h/4 in a field period, the delay will be four-frame periods (equivalent to two-frame periods in interlaced scanning).

Figure 5:
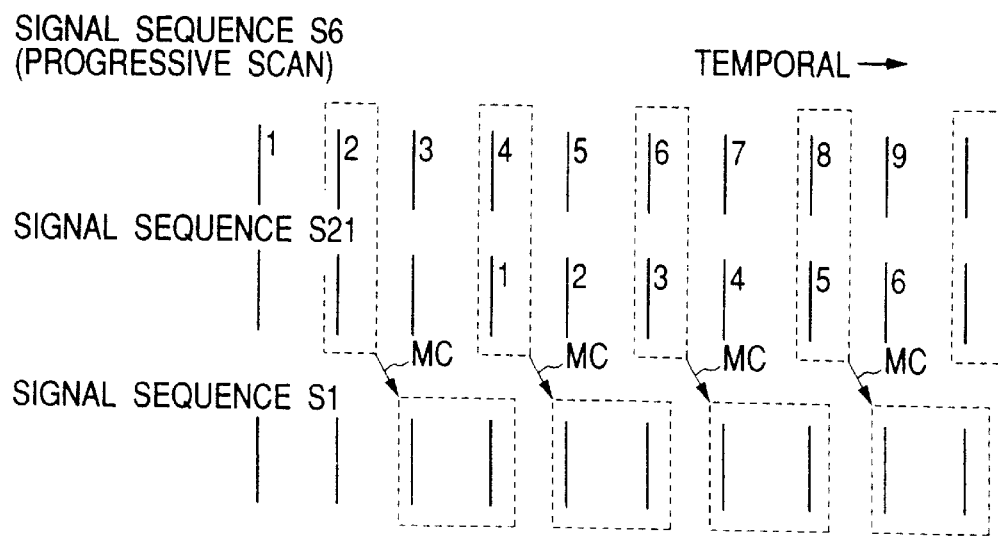
FIG. 5 illustrates typical signal sequences used for motion vector detection.

FIG. 5 illustrates the positional relationship between the signals S21 and S6 and schematically the signal sequences used for motion vector detection in this case. The motion vectors are detected between the signals S6 of 1, 2, 3, 4, 5, 6, 7, 8, 9, . . . in positions of frame sequence and the signals S21, delayed by a four-frame period each, of 1, 2, 3, 4, 5, 6, . . . in positions of frame sequence, and vertical motion vectors with an accuracy equivalent to h/4 in field period of interlaced scanning are thereby obtained. This detection of motion vectors should preferably be performed frame by frame, but this would entail a correspondingly greater quantity of computation needed for search. In view of this, the detection of motion vectors is carried out from signals in every two-frame period surrounded by dotted lines in FIG. 5. Then, for input picture signals S1 in every two consecutive field periods, interpolation signals are generated by motion compensation using these detected motion vectors.

Figure 6:
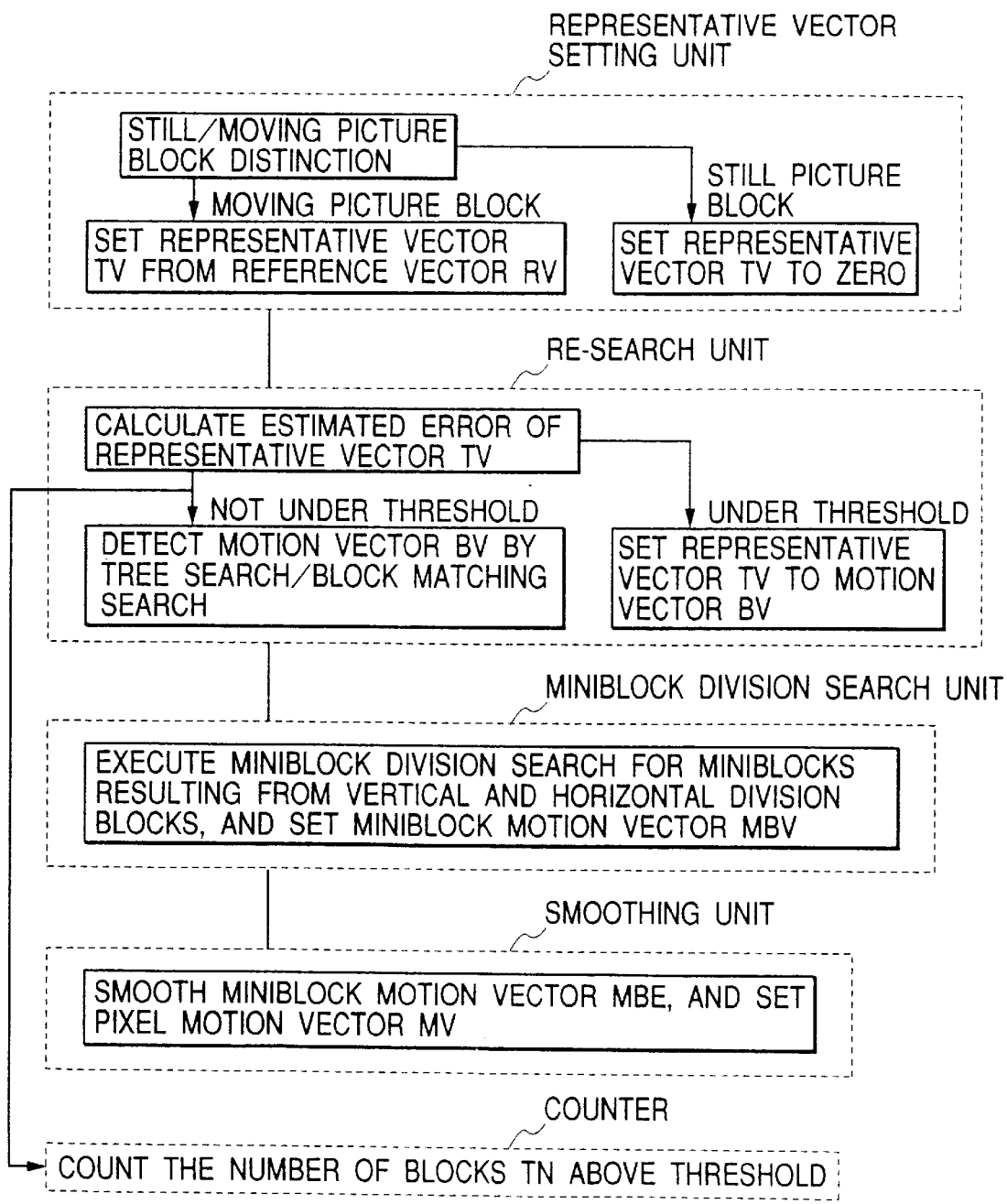
FIG. 6 is a flow chart outlining the signal processing by the motion vector detector.

Referring back to FIG. 4, the representative vector setting unit 18 performs signal processing of the first step of the scheme of signal processing for motion vector detection shown in FIG. 6. Thus, according to the component of difference between the signals S6 and S21, each block (whose size may be, for instance, 8 pixels horizontally×8 pixels vertically) is determined to be either a still or moving picture block. For each still block, the representative vector VT is set to zero. For each moving picture block, on the other hand, an estimated motion error ER, represented by equation 4, is computed for the already detected reference vector RV around the current block.

Equation 4

$$ER = \Sigma |S6(x, y) - S21(x+RVx, y+RVy)| \quad (4)$$

Here, S6(x, y) is the value of the pixel (x, y) of the signal S6; S21(x+RVx, y+RVy), that of the pixel at a point to which the position of the pixel (x, y) of the signal S21 by the reference vector RV (horizontal component RVx, vertical component RVy); symbol | |, its absolute value; and Σ, the total sum of pixels in the current block. The reference vector which gives the smallest estimated motion error ER is selected as the representative vector TV. One example of reference vector is shown in FIG. 7. In this example, the detected motion vectors of the blocks to the upper left of, immediately above, to the upper right of, to the left of, to the right of, to the lower left, immediately below, and to the lower right of the current block are used as reference vectors.

Next, the re-search unit 19 carries out signal processing at the next step of the flow shown in FIG. 6. Thus, if the estimated motion error of the representative vector TV is less than the threshold, this representative vector VT is selected as the motion vectors BV of the current block. Or if it is not less than the threshold, a motion vector is detected by re-search, and it is used as the motion vector BV of the current block.

In order to reduce the quantity of computation required for re-search, if the estimated motion error is, for instance, less than twice the threshold, tree search is done, or it is not less than twice the threshold, search is accomplished by block matching. This is schematically illustrated in FIGS. 8A and 8B. For tree search illustrated in FIG. 8A, the search region is set in the vicinities of the representative vector TV, and the motion vector whose estimated motion error is the smallest in this search region is detected as the motion vector BV. On the other hand, for block matching illustrated in FIG. 8B, the search region is consecutively expanded from region 1 to region 2, . . . and finally to region N, and motion vectors are detected by block matching. When a motion vector BV whose estimated motion error is less than the threshold is detected, the search is completed.

This re-search unit 19 issues pulse signals when a block to be re-searched has emerged. The counter 23 counts the number of these pulse signals in the frame period, and supplies the result as the number TN of re-searched blocks.

Further, one of the motion vectors BV, which are the output of the re-search unit 19, is stored into the memory 22, from which the reference vector RV matching the current block is supplied.

Then, the miniblock division search unit 20 carries out signal processing at the third step of the flow shown in FIG. 6. Thus, for miniblocks (sized, for instance, 2 pixels horizontally×2 pixels vertically), resulting from the horizontal and vertical division of each block, motion vectors MBV are set. This operation is schematically illustrated in FIG. 9, wherein miniblocks result from the division by four each, horizontally and vertically, of a block. First, if the value of the estimated motion error of the current block is less than the threshold (which may be or may not be equal to the threshold of the re-search unit), the motion vector BT of the block is set to the motion vector MBV of all the miniblocks. Or if it is not less than the threshold, the motion vector of the miniblock whose estimated motion error is the least, out of the current block and the blocks surrounding it (e.g. blocks B1 through B8 in FIG. 9), is selected as the motion vector MBV by miniblock division search. Therefore, if there are objects moving differently in a block (as in the regions indicated by oblique dotted lines in FIG. 9), this miniblock division search sets the motion vector of one of blocks B1, B4 and B6 for miniblock MB1, and that of one of blocks B3, B5 and B8 for miniblock MB2, so that the correct motion vector can be set.

The smoothing unit 21 illustrated in FIG. 4, intended for signal processing at the final step of FIG. 6, takes the arithmetic mean, for instance, of the motion vectors MVB of a plurality of surrounding miniblocks including the current miniblock, and sets it as the motion vector MV of pixels in the current miniblock.

The signal processing so far described makes possible accurate detection of motion vectors which is dramatically reduced in the quantity of computation required for searching.

Figure 10:
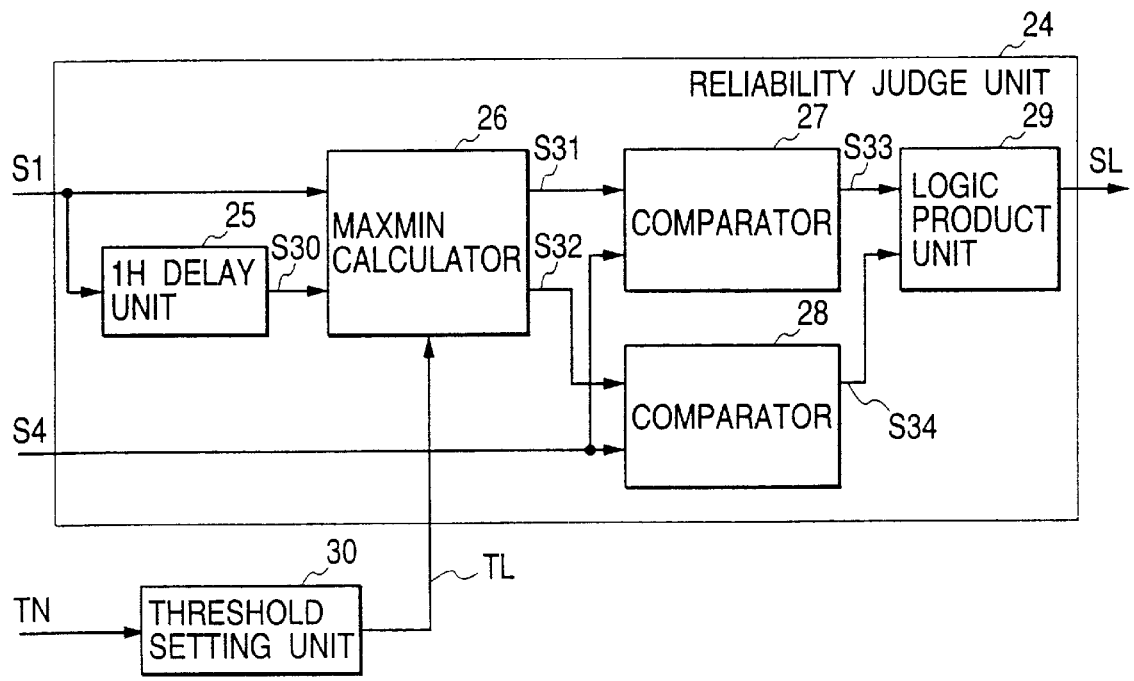
FIG. 10 is a block diagram of a typical configuration of the setting unit of the first embodiment.

Next, the configuration and operation of the setting unit 7 will be described with reference to FIG. 10 through FIG. 14. FIG. 10 shows a first typical configuration of the setting unit 7, comprising a reliability judging unit 24 and a threshold setting unit 30. First, the operation of the reliability judging unit 24 will be schematically described with reference to FIG. 11. The signal S30 in FIG. 11 matches the luminance signal of the interlaced scanning line L1(2n−1)h of the current field earlier shown in FIG. 3; the signal S1, to that of the scanning line L1(2n+1)h; and the MC interpolation scanning line, to that of the scanning line L1(2nh). Signal values Yb, Ya and X are the values of the luminance signals of the pixels at the point x in the horizontal direction of the scanning line, respectively.

Figure 11:
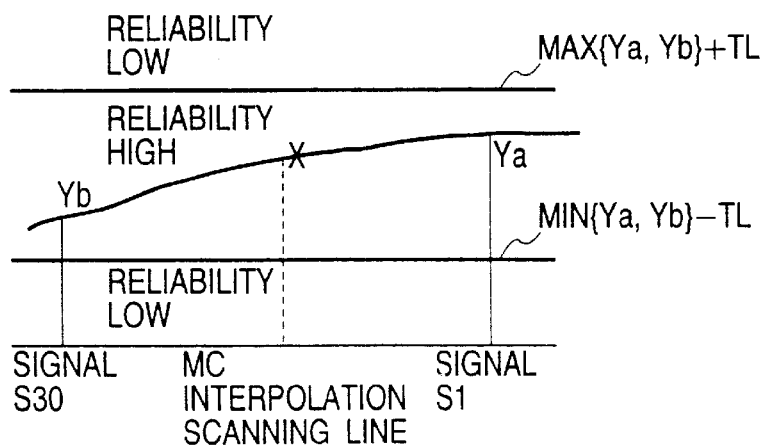
FIG. 11 schematically illustrates the action of the reliability judging unit.

Picture signals usually are signals that continuously vary. Therefore, it is highly probable that the signal value X of the MC interpolation scanning line, as shown in FIG. 11, is present within the range from MIN{Ya, Yb}−TL to MAX{Ya, Yb}+TL, where MIN signifies the minimum values of Ya and Yb, and MAX, their maximum values. Now, when interpolation signals by motion compensation are within this range, it is judged that the signals are highly reliable, and the probability of picture quality deterioration ensuing from erroneous detection of motion vectors is extremely low. Conversely, when they deviate from this range, it is judged that they are unreliable and involve a high probability of picture quality deterioration.

Referring back to FIG. 10, luminance signals of input picture signals S1 and signals S30, resulting from their delaying by the 1H delay unit 25 by one scanning line period are entered into a MAXMIN calculator 26. Then, on the basis of the threshold TL supplied from the threshold setting unit 30, the MAXMIN calculator 26 calculates the uppermost level S31(MAX{Ya, Yb}+TL) and the lowermost level S32(MIN{Ya, Yb}−TL) of reliability. A comparator 27 compares the luminance signals of interpolation signals S4 by motion compensation with the uppermost level S31, and supplies 1 as the signal S33 if they are below the upper level, of 0 if they are not below the upper level. A comparator 28 compares the luminance signals of interpolation signals S4 by motion compensation with the lowermost level S32, and supplies 1 as the signal S34 if they are not below the upper level, of 0 if they are below the upper level. A logical product unit 29 calculates the logical product of the two, and supplies the result to the control signal SL (1 if the reliability is high or 0 if it is low).

Figure 12:
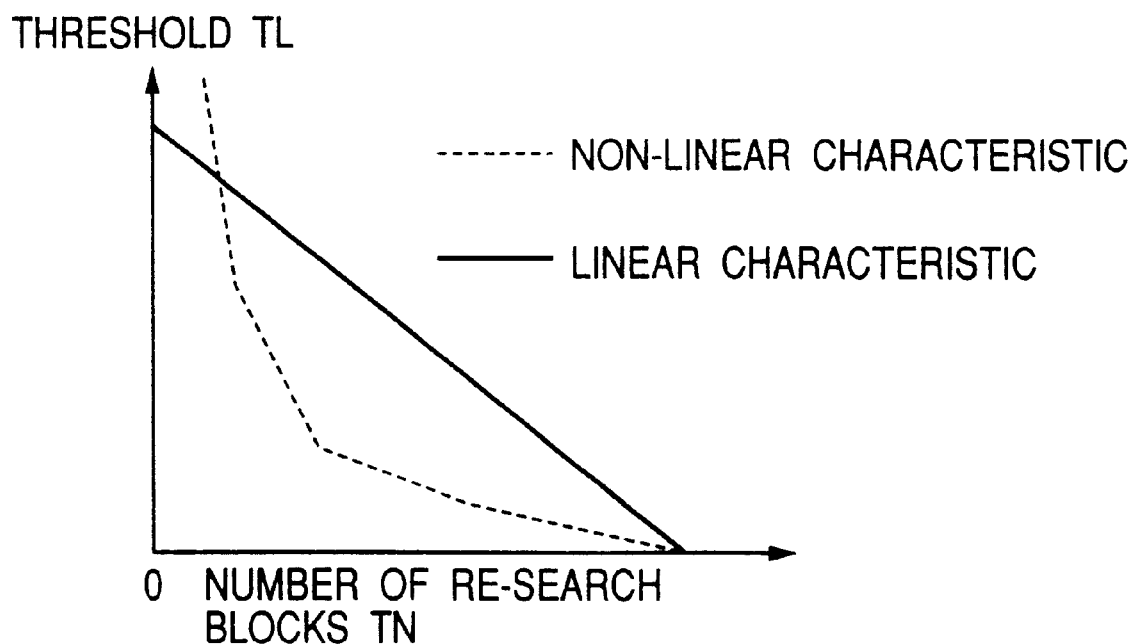
FIG. 12 is a characteristics diagram of typical threshold setting.

The threshold setting unit 30, on the basis of the number TN of re-searched blocks, sets the threshold TL. One example of this threshold setting is shown in FIG. 12, wherein the horizontal axis represents the number TN of re-searched blocks in motion vector detection, and the vertical axis, the value of the threshold TL. As stated earlier, motion vector detection according to the present invention tends to become less accurate with an increase in the number of re-searched blocks. Taking note of this point, as illustrated in FIG. 12, the threshold TL is set with a characteristic that its value gradually decreases with an increase in the number of re-searched blocks. In this setting, the characteristic may be linear as represented by the solid line or non-linear as denoted by the dotted line.

Figure 13A:
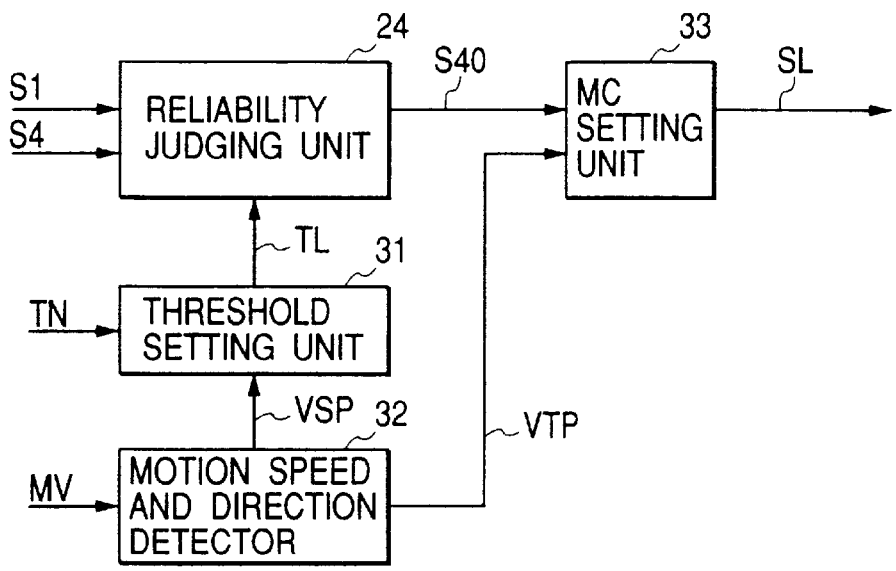
FIGS. 13A and 13B are block diagrams of another configuration of the setting unit of the first embodiment.
Figure 13B:
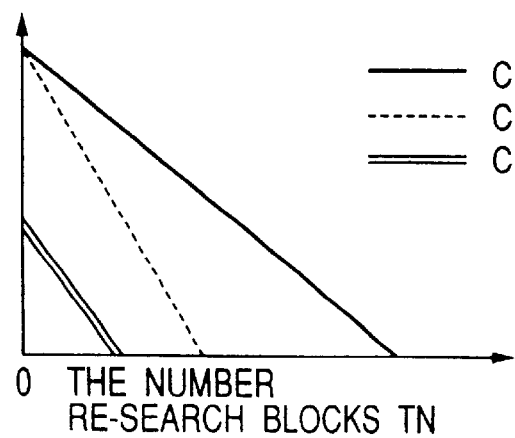

FIGS. 13A and 13B illustrate a second example of the setting unit 7. This is suitable for performing finer control according to the motions of pictures. FIG. 13A shows its configuration, comprising a reliability judging unit 24, a threshold setting unit 31, a motion speed and direction detector 32, and an MC setting unit 33.

The reliability judging unit 24, configured and operating in the same way as its counterpart in FIG. 10, supplies a signal S40 (1 when the reliability is high or 0 when it is low).

The motion speed and direction detector 32 detects the speed and direction from motion vectors MV, and supplies speed information VSP and motion shape information VTP. For example, the speed information VSP gives a signal of 0 when the speed is below the threshold V1 (slow motion), one of 1 when it is not below the threshold V1 but less than V2 (not too fast for human eyes to follow), or one of 2 when it is V2 or above (fast motion). The motion shape information VTP gives 1 as the V pan mode for a vertical motion such as vertical panning or vertical rolling, or 0 as the normal mode for any other motion.

The threshold setting unit 31 supplies the threshold TL according to what the speed information VSP is. One example is shown in FIG. 13B. It uses characteristic 1 represented by the solid line when the speed information VSP is 0, characteristic 2 represented by the dotted line when VSP is 1, or characteristic 3 represented by the double line when VSP is 2, to supply the threshold TL according to the number TN of re-searched blocks.

The MC setting unit 33, on the basis of the signal S40 and the motion shape information VTP, sets the control signal SL. This setting is schematically illustrated in FIG. 13B. When the motion shape information VTP is 1, representing the V pan mode, it supplies 1 as the control signal SL irrespective of what the signal S40 is, because when motions are in the V pan mode, substantially accurate motion vectors are detected even if the number of researched blocks is large. On the other hand, when 0 representing the normal mode is supplied, 1 is supplied as the signal control signal SL only when the signal S40 is 1.

Figures 14A, 14B, 14C:
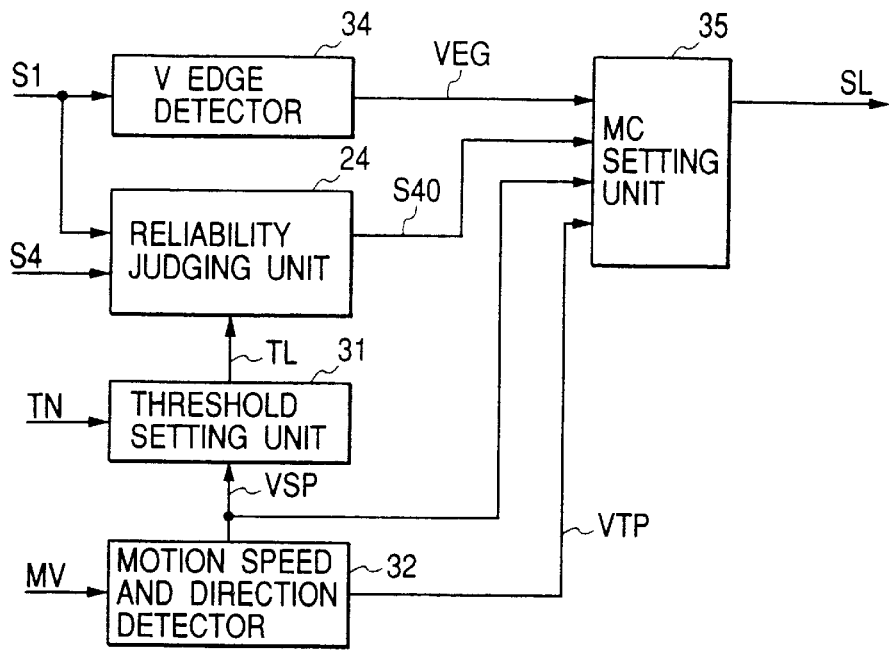
FIGS. 14A–14C block diagrams of still another configuration of the setting unit of the first embodiment.

FIGS. 14A–14C illustrates a third example of the setting unit 7. This is suitable for performing still finer control according to the motions of pictures. FIG. 14A shows its configuration, comprising a reliability judging unit 24, a threshold setting unit 31, a motion speed and direction detector 32, a V edge detector 34 and an MC setting unit 35. Of these constituent elements, the reliability judging unit 24, the threshold setting unit 31, and the motion speed and direction detector 32 are the same as their respective counterparts in FIGS. 13A and 13B, and their description is therefore dispensed with.

The V edge detector 34 detects a region containing high frequency vertical components from the component of difference signals between the luminance signals of the input picture signals S1 and the signals resulting from the delaying of the signals S1 by a one-scanning line period. It supplies an edge signal VEG of 1 for the region containing high frequency vertical components or 0 for any other region.

The MC setting unit 35 sets the control signal SL on the basis of the edge signal VEG, the speed information VSP, the motion shape information VTP, and the signal S40. One example of such setting is shown in FIG. 14B. In the V pan mode or when the speed is less than V1 in the normal mode, the MC setting unit 35 operates in the same way as its counterpart in the second configuration described earlier does. Or, when the speed is not less than V1 in the normal mode, the MC setting unit 35 supplies 1 as the control signal SL in the region containing high frequency vertical components where the edge signal VEG is 1 and where the reliability is high, with a signal 40 of 1.

FIG. 14C shows another example, in which 0 is supplied as the control signal SL when motions are extremely vehement, the speed being V3 or above. Thus, when motions are vehement, generation of interpolation signals by motion compensation is stopped, and interpolation signals are generated instead by the conventional motion-adaptive process.

Description of main blocks is now completed. Of other blocks, description is dispensed with because they can be readily realized by the prior art.

As described so far, this embodiment can provide a low-cost scan conversion circuit using motion compensation ensuring high picture quality. It can significantly contribute to achieving high picture quality in television receivers, data processing terminals for home use, and other image display units.

(Embodiment 2)

Now, a second preferred embodiment of the present invention will be described below with reference to FIG. 15 and FIG. 16. The configuration of the scan conversion circuit using motion compensation, which is this second embodiment, is illustrated in FIG. 15.

Figure 15:
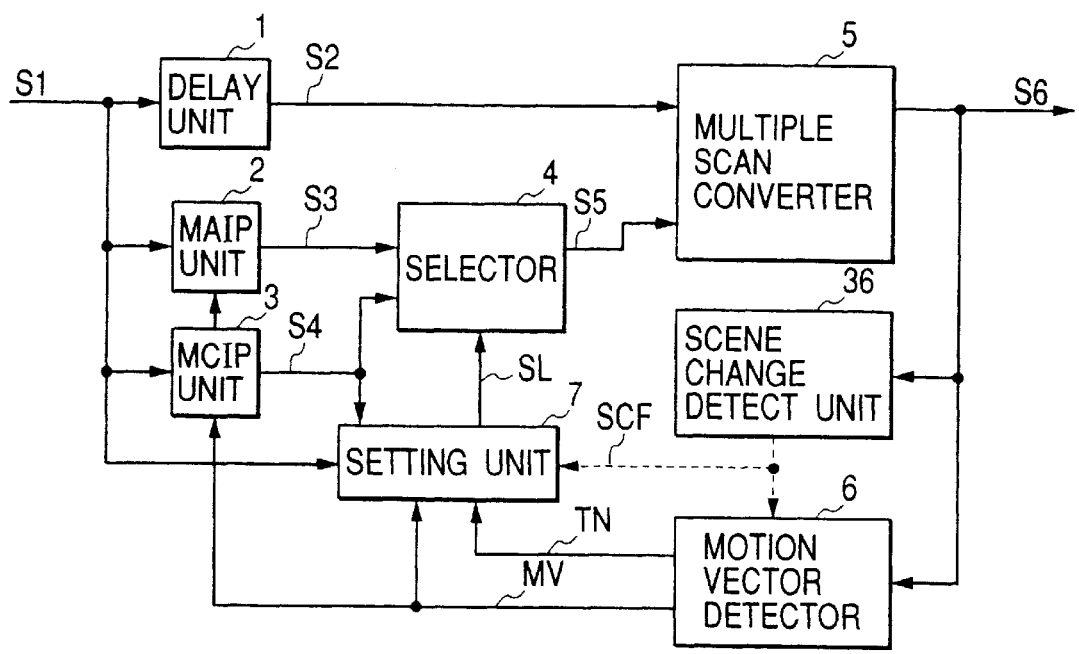
FIG. 15 is a block diagram of a scan conversion circuit using motion compensation, which is a second preferred embodiment of the invention.

The delay unit 1, MAIP unit 2, MCIP unit 3, selector 4, multiple scan converter 5, motion vector detector 6, and setting unit 7 in FIG. 15 are similar in configuration to their respective counterparts shown earlier in FIG. 1. A scene change detector 36 is newly added. In this configuration, 1 is supplied as a signal SCF in a region where the picture has undergone a scene change, or 0 is supplied in any other region.

The motion vector detector 6 and the setting unit 7 operate similarly to their respective counterparts in the first embodiment when the signal SCF is 0. On the other hand, when the signal SCF is 1, the motion vector detector 6 stops detecting motion vectors. As a result, the enormous quantity of required computation that would otherwise arise in the scene change region can be suppressed. The setting unit 7 gives 0 as the control signal SL. In a region where a scene change has taken place, progressive scanning is accomplished by the conventional motion-adaptive process.

Figure 16:
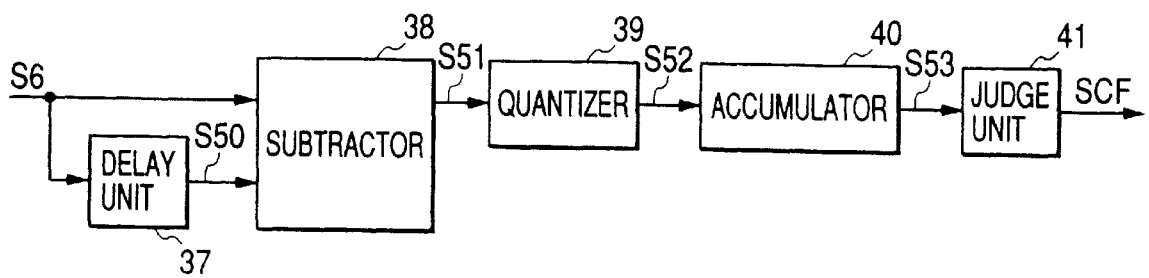
FIG. 16 is a block diagram illustrating a typical configuration of the scene change detector of the second embodiment.

FIG. 16 illustrates a typical configuration of the scene change detector. The luminance signals of the output picture signals S6 the signals S50 resulting from the delaying of the signals S6 by the delay unit 37 by a prescribed frame period (the same delay time as that of the delay unit of the motion vector detector shown in FIG. 4) are subjected to subtraction by a subtractor 38, and frame difference signals S51 are detected. A quantizer 39 performs signal processing for binary quantization, and supplies a binary signal S52 of 1 when the frame difference component is not less than a prescribed value or of 0 when it is less than the prescribed value. An accumulator 40 counts the number of "1" in each frame period and supplies the cumulative count as a signal S53. A judging unit 41, if this cumulative count S53 covers a half or more of the frame, judges that it is a region in which a scene change has taken place and supplies 1 as the signal SCF, or outputs 0 in all other cases.

As described so far, this embodiment can provide a low-cost scan conversion circuit using motion compensation ensuring high picture quality. Therefore it can significantly contribute to achieving high picture quality in television receivers, data processing terminals for home use, and other image display units.

(Embodiment 3)

Next, a third preferred embodiment of the present invention will be described below with reference to FIG. 17 and FIG. 18. This embodiment is suitable for detection of motion vectors in an input picture signal sequence.

Figure 17:
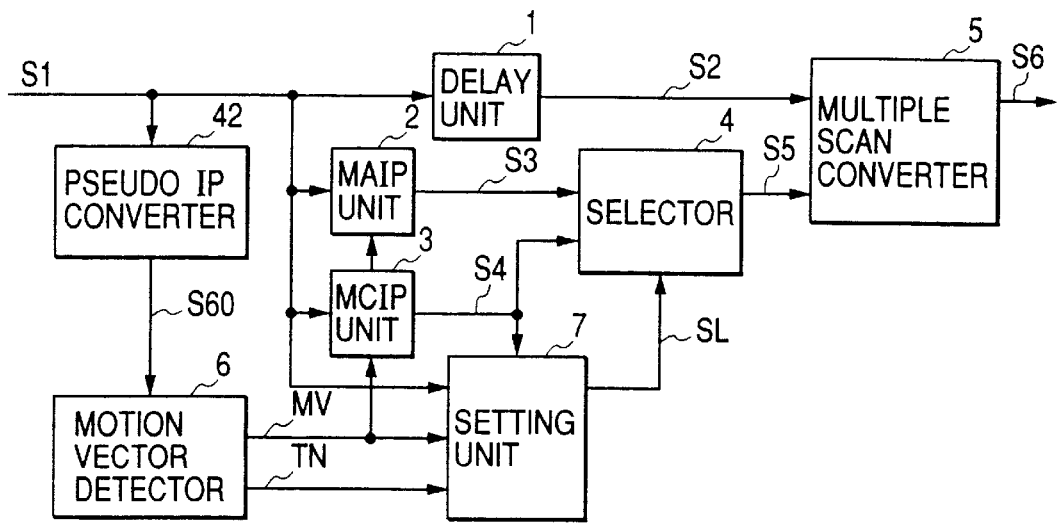
FIG. 17 is a block diagram of a scan conversion circuit using motion compensation, which is a third preferred embodiment of the invention.

FIG. 17 illustrates another configuration of this embodiment, which is a scan conversion circuit using motion compensation. The delay unit 1, MAIP unit 2, MCIP unit 3, selector 4, multiple scan converter 5, motion vector detector 6, and setting unit 7 in FIG. 17 are similar in configuration and operation to their respective counterparts in other embodiments so far described, while a pseudo IP converter 42 performs such signal processing as synthesis of signals in two consecutive fields or intrafield interpolation on the luminance signals of interlaced scanning input picture signals S1, and thereby generates frame picture signals S60 for use in the detection of motion vectors.

Figure 18:
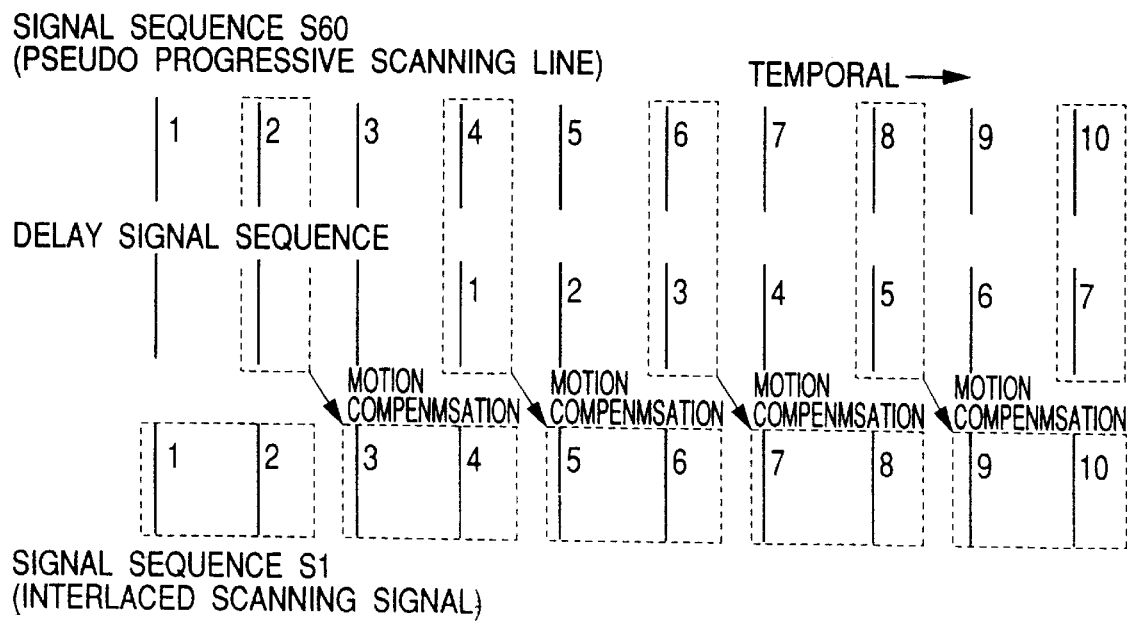
FIG. 18 illustrates typical signal sequences for use in motion vector detection by the third embodiment.

FIG. 18 schematically illustrates the operations of motion vector detection and motion compensation with these frame picture signals S60. The accuracy of motion compensation for vertical motions, as was the case with earlier described embodiments, is supposed to be h/4. The motion vectors are detected between the frame picture signals S60 of 1, 2, 3, 4, 5, 6, 7, 8, 9, 10, . . . in positions of frame sequence and the signals delayed by a four-frame period each of 1, 2, 3, 4, 5, 6, . . . in positions of frame sequence. This detection of motion vectors should preferably be performed frame by frame, but this would entail a greater quantity of computation needed for search. In view of this, the detection of motion vectors is carried out from signals in every two-frame period surrounded by dotted lines in FIG. 18. Then, for input picture signals S1 in every two consecutive field periods, interpolation signals are generated by motion compensation using these detected motion vectors.

(Embodiment 4)

Figure 19:
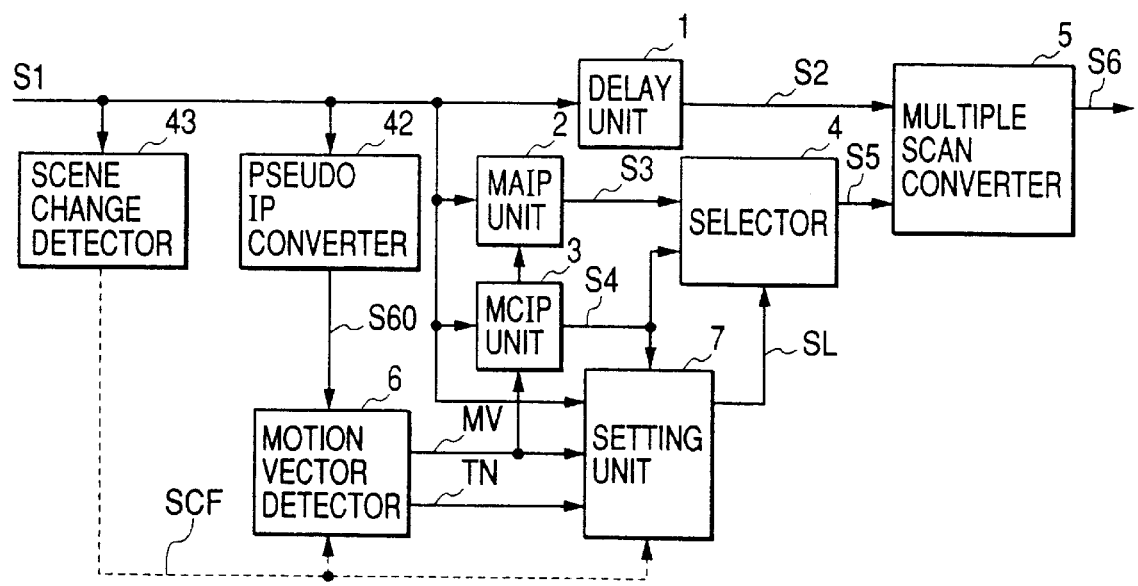
FIG. 19 is a block diagram of a scan conversion circuit using motion compensation, which is a fourth preferred embodiment of the invention.

Now, a fourth preferred embodiment of the present invention is illustrated in FIG. 19. In FIG. 19, the delay unit 1, MAIP unit 2, MCIP unit 3, selector 4, multiple scan converter 5, motion vector detector 6, setting unit 7 and pseudo IP converter 42 in FIG. 19 are the same as their respective counterparts in the third embodiment illustrated in FIG. 17, while the scene change detector 43 supplies 1 as the signal SCF in a region where the picture has undergone a scene change, or outputs 0 in any other region. When the signal SCF is 0, the motion vector detector 6 and the setting unit 7 operate in the same way as their respective counterparts in the third embodiment. On the other hand, when the signal SCF is 1, the motion vector detector 6 stops detecting motion vectors. As a result, the enormous quantity of required computation that would otherwise arise in the scene change region can be suppressed. The setting unit 7 gives 0 as the control signal SL. In a region where a scene change has taken place, progressive scanning is accomplished by the conventional motion-adaptive process.

As described so far, the third and fourth embodiments of the present invention can provide a low-cost scan conversion circuit using motion compensation ensuring high picture quality. Therefore they can significantly contribute to achieving high picture quality in television receivers, data processing terminals for home use, and other image display units.

(Embodiment 5)

Next, a fifth preferred embodiment of the present invention will be described below with reference to FIG. 20 and FIG. 21. This embodiment is suitable for application to picture signals estimatively encoded by motion compensation, for example such as MPEG video coding process.

Figure 20:
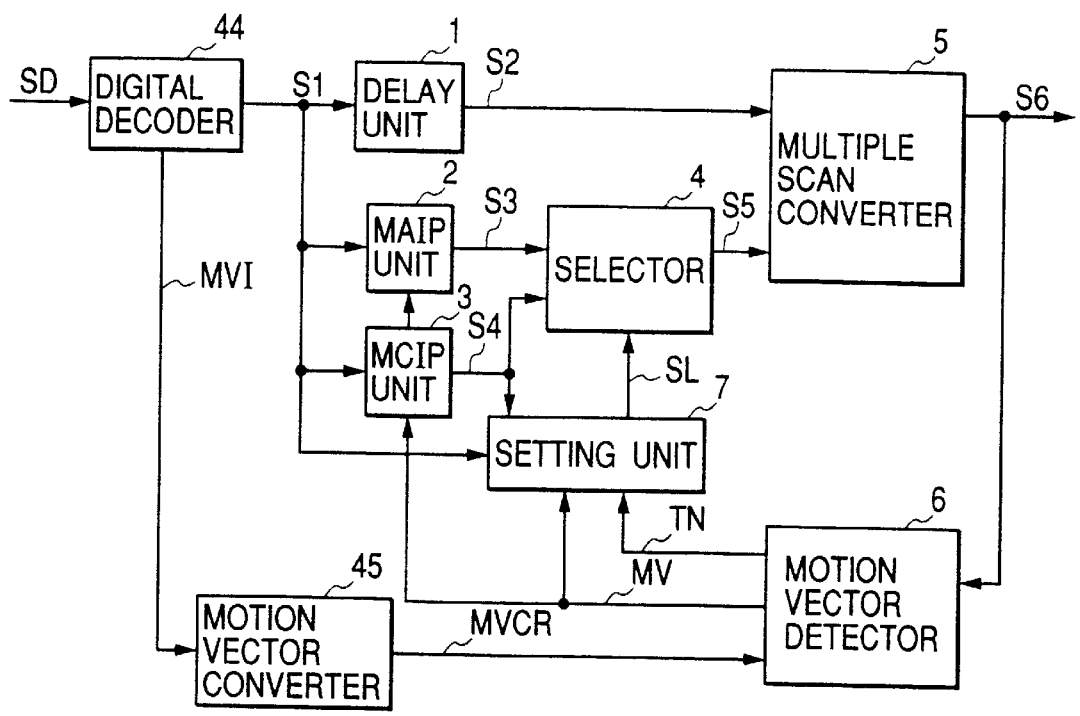
FIG. 20 is a block diagram of a scan conversion circuit using motion compensation, which is a fifth preferred embodiment of the invention.

FIG. 20 illustrates another configuration of this embodiment, which is a scan conversion circuit using motion compensation. The delay unit 1, MAIP unit 2, MCIP unit 3, selector 4, multiple scan converter 5, and setting unit 7 in FIG. 17 are similar in configuration and operation to their respective counterparts in the first and second embodiments.

Encoded video data signals SD such as MPEG video signals undergo prescribed decoding by a digital decoder 44 into interlaced scanned picture signals S1 (luminance signals and color differential signals). Motion vector information MVI used in the decoding is also outputted.

A motion vector converter 45 converts this motion vectors information MVI to generate a motion vector MVCR usable in motion vector detection as the reference vector. The motion vector detector 6 detects motion vectors, using also this motion vector MVCR as the reference vector.

Figure 21:
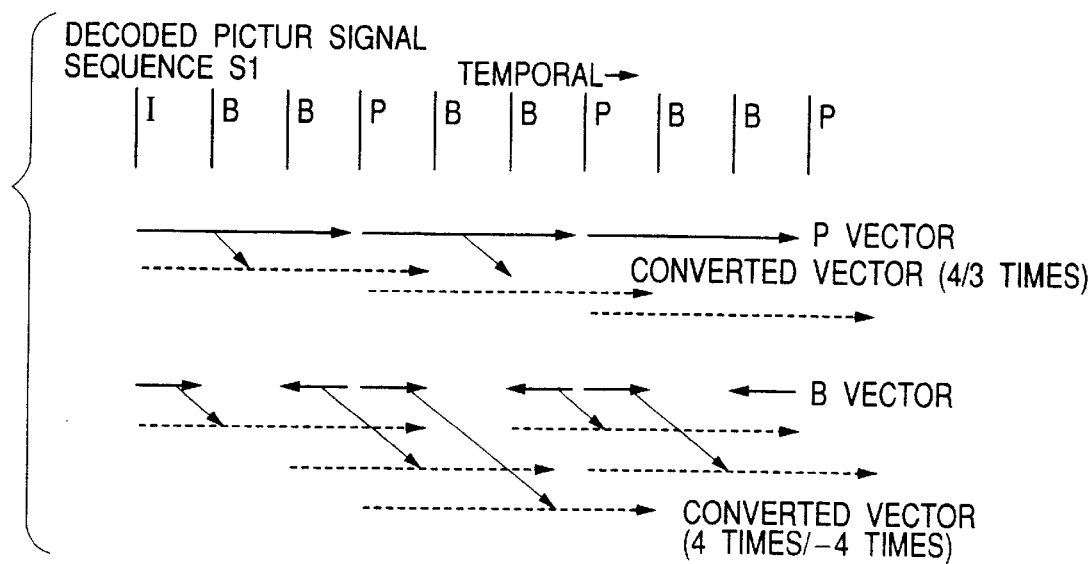
FIG. 21 schematically illustrates the action of the motion vector converter of the fifth embodiment.

FIG. 21 schematically illustrates the operation of this motion vector converter. In estimative encoding by motion compensation such as MPEG video coding, pictures are classified in three kinds denoted by signs I, P and B. Pictures I are subjected to DCT conversion encoding. Pictures P, on the other hand, undergo unidirectional estimative encoding by motion compensation. In this encoding, P vectors shown in FIG. 21 (corresponding to motion vectors having a three-frame period therein) are used as motion vectors. Pictures B are subjected to bidirectional estimative encoding by motion compensation, an example of whose motion vectors is shown as B in FIG. 21 (corresponding to motion vectors having a one-frame period therein). In motion vector information MVI, these P vectors and B vectors coexist in mixture.

On the other hand, in scan conversion by motion compensation, as described so far, motion vectors are detected in each four-frame period. For this reason, P vectors are subjected to conversion by multiplying them by 4/3, or B vectors, to conversion by multiplying them by 4 or −4 (for vectors in the reverse direction), to generate motion vectors MVCR equivalent to vectors whose period is four frames long.

(Embodiment 6)

Now will be described a sixth preferred embodiment of the present invention with reference to FIG. 22. This embodiment, too, is suitable for application to picture signals estimatively encoded by motion compensation.

Figure 22:
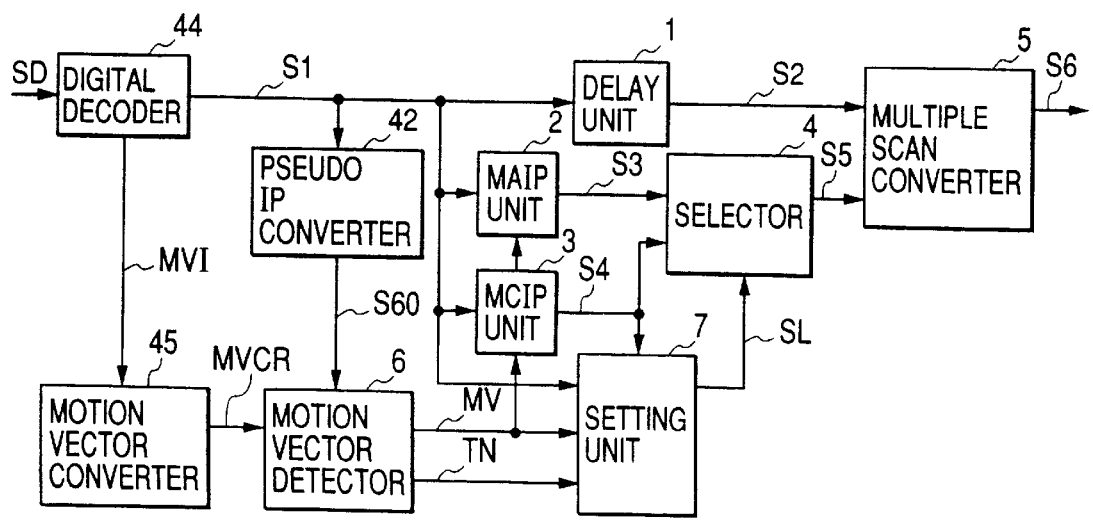
FIG. 22 is a block diagram of a scan conversion circuit using motion compensation, which is a sixth preferred embodiment of the invention.

The delay unit 1, MAIP unit 2, MCIP unit 3, selector 4, multiple scan converter 5, setting unit 7 and pseudo IP converter 42 in FIG. 22 are similar in configuration and operation to their respective counterparts in the third and fourth embodiments. The digital decoder 44 and the motion vector converter 45 are also configured and operate similarly to their respective counter parts in the fifth embodiment. The motion vector detector 6 detects motion vectors, using also the motion vector MVCR as the reference vector.

As described so far, the fifth and sixth embodiments of the present invention can provide a low-cost scan conversion circuit using motion compensation ensuring high picture quality for signals estimatively encoded by motion compensation. Therefore they can significantly contribute to achieving high picture quality in television receivers, data processing terminals for home use, and other image display units.

(Embodiment 7)

Figure 23:
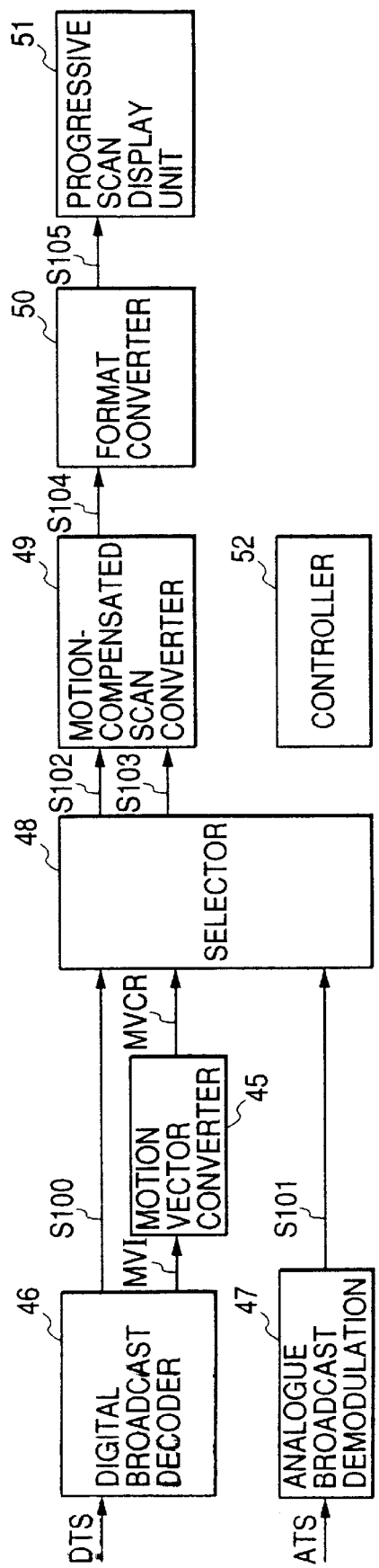
FIG. 23 is a block diagram of an embodiment of application of the present invention to a television receiver.

Finally, regarding embodiments of application of a scan conversion circuit using motion compensation according to the present invention to television receivers, data processing terminals for home use, and other image display units, a case of application to a television receiver will be described with reference to FIG. 23.

Digital broadcast signals DTS are entered into a digital broadcast decoder 46 to be subjected to prescribed decoding into picture signals S100 (luminance signals and color differential signals) and motion vector information MV1. The motion vector converter 45 converts the vectors to generate motion vectors MVCR usable as reference vectors.

Analogue broadcast signals ATS are entered into an analogue broadcast decoder 47 to undergo prescribed decoding into picture signals S101 (luminance signals and color differential signals).

A selector 48 selects required signals with a control signal (not shown) from a controller 52, and supplies picture signals S102 and motion vector signals S103.

A motion compensation scan converter 49, an original feature of the present invention, converts interlaced scanned signals into progressive scanned signals, and supplies progressive scanned picture signals S104 (luminance signals and color differential signals).

A format converter 50 carries out conversion into signals matching the number of pixels, that of scanning lines and that of frames prescribed by a signal progressive scan display unit 51. It also performs color conversion into aluminance and color differential signals into three-primary color RGB signals, and supplies progressive scanned three-primary color RGB signals S105. Pictures are then displayed on the progressive scan display unit 51 in a progressive scanned form.

The controller 52 generates signals needed for the operation of each unit and supplies them to where they are required.

As hitherto described, this embodiment can significantly contribute to enhancing the picture quality of television receivers. It is evident that, though explanation is dispensed with here, data processing terminals for home use or other image display units of higher picture quality can also be realized in a similar manner to this embodiment.

According to the invention, a scan conversion circuit of extremely high picture quality, which is free from picture quality deterioration otherwise inevitable in motion compensation and can hardly be achieved by the prior art, can be realized at low cost. Thus it can significantly contribute to achieving high picture quality in television receivers, data processing terminals for home use, and other image display units.

While the present invention has been described above with reference to the preferred embodiments, any person of ordinary skill in the art would be enabled by this disclosure to make various modifications of these embodiments and still be within the scope and spirit of the invention as defined in the appended claims.

What is claimed is:

1. A motion-compensated picture signal scan conversion circuit for converting interlaced scanned picture signals into progressive scanned picture signals provided with:

a first interpolation signal generator for generating signals of scanning lines skipped in interlaced scanning by motion-adaptive interpolation;

a second interpolation signal generator for generating signals of scanning lines skipped in interlaced scanning by motion-compensated interpolation;

a motion vector detector for detecting motions necessary for motion-compensated interpolation; and a setting unit for checking the reliability of motion compensation by comparing signals from said second interpolation signal generator with signals on interlaced scanning lines, and setting the selection of signals from said first and second interpolation signal generators, wherein:

said setting unit adaptively varies the threshold of the comparison used for checking the reliability according to the number of re-searched blocks in motion vector detection by said motion vector detector, and sets the threshold so that the threshold become smaller with an increase in said number of blocks.

2. A motion-compensated picture signal scan conversion circuit, as claimed in claim 1, wherein:

the threshold of the comparison used for checking the reliability by said setting unit is set according to a linear relationship between the number of re-searched blocks and the threshold.

3. A motion-compensated picture signal scan conversion circuit, as claimed in claim 1, wherein:

the threshold of the comparison used for checking the reliability by said setting unit is set according to a non-linear relationship between the number of re-searched blocks and the threshold.

4. A motion-compensated picture signal scan conversion circuit, as claimed in claim 1, wherein:

the threshold of the comparison used for checking the reliability by said setting unit is set by selecting one of a plurality of alternatives with the motion vector speed detected by said motion vector detector as parameter.

5. A motion-compensated picture signal scan conversion circuit, as claimed in claim 1, wherein:

the threshold of the comparison used for checking the reliability by said setting unit is set, when the motion vectors detected by said motion vector detector indicate vertical panning or vertical rolling, to its upper limit.

6. A motion-compensated picture signal scan conversion circuit, as claimed in claim 1, wherein:
said setting unit selects, when the speed of the motion vectors is not less than the threshold, the signal from said first interpolation signal generator.

7. A motion-compensated picture signal scan conversion circuit, as claimed in claim 1, wherein:
said setting unit is provided with a V edge detector for detecting high frequency vertical components of picture signals and, when the speed of the motion vectors is not less than the threshold, uses the signal from said second interpolation signal generator only in a region around a detected edge region.

8. A motion-compensated picture signal scan conversion circuit, as claimed in claim 1, wherein:
the motion vector detector detects motion vectors from frame pictures of an output picture signal sequence converted into progressive scanned signals.

9. A motion-compensated picture signal scan conversion circuit, as claimed in claim 1, wherein:
the motion vector detector detects motion vectors from frame pictures generated by synthesis of signals in two consecutive fields or intra-field interpolation in an input picture signal sequence.

10. A motion-compensated picture signal scan conversion circuit, as claimed in claim 1, wherein:
signals on interpolation scanning lines in every two consecutive field periods are generated in motion-compensated interpolation from motion vectors detected by the motion vector detector.

11. A motion-compensated picture signal scan conversion circuit, as claimed in claim 1, wherein:
the motion vector detector detects the motion vector for each pixel by signal processing through setting a representative vector using already detector motion vectors around a current block as reference vectors, re-searching, searching of miniblocks resulting from the division of each block horizontally and vertically, and smoothing.

12. A motion-compensated picture signal scan conversion circuit, as claimed in claim 11, wherein:
motion vectors generated by subjecting motion vector information in the estimative encoding by motion compensation to prescribed motion vector conversion are used as reference vectors in setting the representative vector.

13. A motion-compensated picture signal scan conversion circuit, as claimed in claim 1, further provided with:
a unit for detecting scene changing in pictures, wherein:
said detection of motion vectors and generation of interpolation signals by motion compensation are stopped in a region where any scene change has taken place.

14. A television receiver having:
a picture display unit of a progressive scanning type, and
a motion-compensated picture signal scan conversion circuit for converting interlaced scanned picture signals into progressive scanned picture signals, wherein:
the motion-compensated picture signal scan conversion circuit for converting interlaced scanned picture signals into progressive scanned picture signals is provided with a first interpolation signal generator for generating signals of scanning lines skipped in interlaced scanning by motion-adaptive interpolation; a second interpolation signal generator for generating signals of scanning lines skipped in interlaced scanning by motion-compensated interpolation; a motion vector detector for detecting motions necessary for motion-compensated interpolation; and a setting unit for checking the reliability of motion compensation by comparing signals from said second interpolation signal generator with signals on interlaced scanning lines, and setting the selection of signals from said first and second interpolation signal generators, wherein: said setting unit adaptively varies the threshold of the comparison used for checking the reliability according to the number of researched blocks in motion vector detection by said motion vector detector, and sets the threshold so that the threshold become smaller with an increase in said number of blocks.

15. A data processing terminals for home use having:
a picture display unit of a progressive scanning type, and
a motion-compensated picture signal scan conversion circuit for converting interlaced scanned picture signals into progressive scanned picture signals, wherein:
the motion-compensated picture signal scan conversion circuit for converting interlaced scanned picture signals into progressive scanned picture signals is provided with a first interpolation signal generator for generating signals of scanning lines skipped in interlaced scanning by motion-adaptive interpolation; a second interpolation signal generator for generating signals of scanning lines skipped in interlaced scanning by motion-compensated interpolation; a motion vector detector for detecting motions necessary for motion-compensated interpolation; and a setting unit for checking the reliability of motion compensation by comparing signals from said second interpolation signal generator with signals on interlaced scanning lines, and setting the selection of signals from said first and second interpolation signal generators, wherein: said setting unit adaptively varies the threshold of the comparison used for checking the reliability according to the number of re-searched blocks in motion vector detection by said motion vector detector, and sets the threshold so that the threshold become smaller with an increase in said number of blocks.

16. A picture display unit having:
a picture display unit of a progressive scanning type, and
a motion-compensated picture signal scan conversion circuit for converting interlaced scanned picture signals into progressive scanned picture signals, wherein:
the motion-compensated picture signal scan conversion circuit for converting interlaced scanned picture signals into progressive scanned picture signals is provided with a first interpolation signal generator for generating signals of scanning lines skipped in interlaced scanning by motion-adaptive interpolation; a second interpolation signal generator for generating signals of scanning lines skipped in interlaced scanning by motion-compensated interpolation; a motion vector detector for detecting motions necessary for motion-compensated interpolation; and a setting unit for checking the reliability of motion compensation by comparing signals from said second interpolation signal generator with signals on interlaced scanning lines, and setting the selection of signals from said first and second interpolation signal generators, wherein: said setting unit adaptively varies the threshold of the comparison used for checking the reliability according to the number of re-searched blocks in motion vector detection by said motion vector detector, and sets the threshold so that the threshold become smaller with an increase in said number of blocks.

* * * * *